United States Patent
Lee et al.

(10) Patent No.: US 10,019,779 B2
(45) Date of Patent: Jul. 10, 2018

(54) BROWSING INTERFACE FOR ITEM COUNTERPARTS HAVING DIFFERENT SCALES AND LENGTHS

(71) Applicant: Amazon Technologies, Inc., Seattle, WA (US)

(72) Inventors: Jongwoo Lee, Seattle, WA (US); Alexander Adrian Hugh Davidson, Seattle, WA (US); Charles Shearer Dorner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 15/064,484

(22) Filed: Mar. 8, 2016

(65) Prior Publication Data
US 2017/0262959 A1 Sep. 14, 2017

(51) Int. Cl.
*G09G 5/00* (2006.01)
*G06T 3/00* (2006.01)
*G06T 7/00* (2017.01)
*G06F 3/0484* (2013.01)
*G06Q 30/00* (2012.01)

(52) U.S. Cl.
CPC ........ *G06T 3/0068* (2013.01); *G06F 3/04845* (2013.01); *G06T 7/0026* (2013.01); *G06Q 30/00* (2013.01)

(58) Field of Classification Search
None
See application file for complete search history.

(56) References Cited

U.S. PATENT DOCUMENTS

| | | | |
|---|---|---|---|
| 5,397,081 A | 3/1995 | Landry et al. | |
| 5,680,528 A * | 10/1997 | Korszun | A41H 3/007 345/630 |
| 7,472,077 B2 | 12/2008 | Roseman et al. | |
| 7,685,074 B2 | 3/2010 | Linden et al. | |
| 8,122,020 B1 | 2/2012 | Donsbach et al. | |
| 2012/0265644 A1 | 10/2012 | Roa et al. | |
| 2013/0259374 A1 | 10/2013 | He et al. | |
| 2013/0339198 A1 | 12/2013 | Gray et al. | |
| 2014/0137052 A1 | 5/2014 | Hernandez et al. | |
| 2014/0176565 A1* | 6/2014 | Adeyoola | G06T 19/006 345/473 |

(Continued)

OTHER PUBLICATIONS

International Search Report for International Application No. PCT/US2017/020979 dated Jul. 6, 2017.

*Primary Examiner* — Peter Hoang
(74) *Attorney, Agent, or Firm* — Knobbe Martens Olson & Bear LLP

(57) ABSTRACT

Features are disclosed for an interface for browsing images of items having different scales and lengths such as clothing. The interface may present two portions of a subject, each portion selected from different data stores of images. The interface may provide a unified view of the portions. For example, a first portion may be taken from an image of the subject wearing a golf shirt and long pants. A second portion may be taken from an image of the subject wearing a long sleeved shirt and shorts. The first portion may show only the golf shirt and the second portion may show only the shorts thereby providing a depiction of what the subject would look like wearing the shirt shown in the first image with the shorts shown in the second image.

22 Claims, 10 Drawing Sheets

(56) References Cited

U.S. PATENT DOCUMENTS

2014/0225978 A1* 8/2014 Saban .................. H04N 1/622
                                                             348/14.07
2014/0358737 A1 12/2014 Burke

* cited by examiner ns that allow these disparate images to be combined such that a portion of a first image of a subject is viewable with a portion of a second image of the subject. For

BROWSING INTERFACE FOR ITEM COUNTERPARTS HAVING DIFFERENT SCALES AND LENGTHS

BACKGROUND

An image capturing system may be used to take images of a user over several different days. The images captured may include the user wearing different items (e.g., clothing, accessories, shoes, etc.). A user interface presented on a display of an electronic device may be provided to allow the user to browse the images showing the outfits or looks worn by the user over a period of time. This can help in selecting favorite outfits that have been worn frequently or identifying items infrequently worn to remove from the user's closet.

Retailers, merchants, sellers, manufacturers, stylists, designers, and others may provide or promote such user interfaces to enable a user browse items included in an electronic catalog and/or search an electronic catalog for items available for purchase or other acquisition. For example, the user may browse or scroll through a grid or list of items. These items are typically shown in images taken while being worn by a model or on a hanger but not the user performing the browsing.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
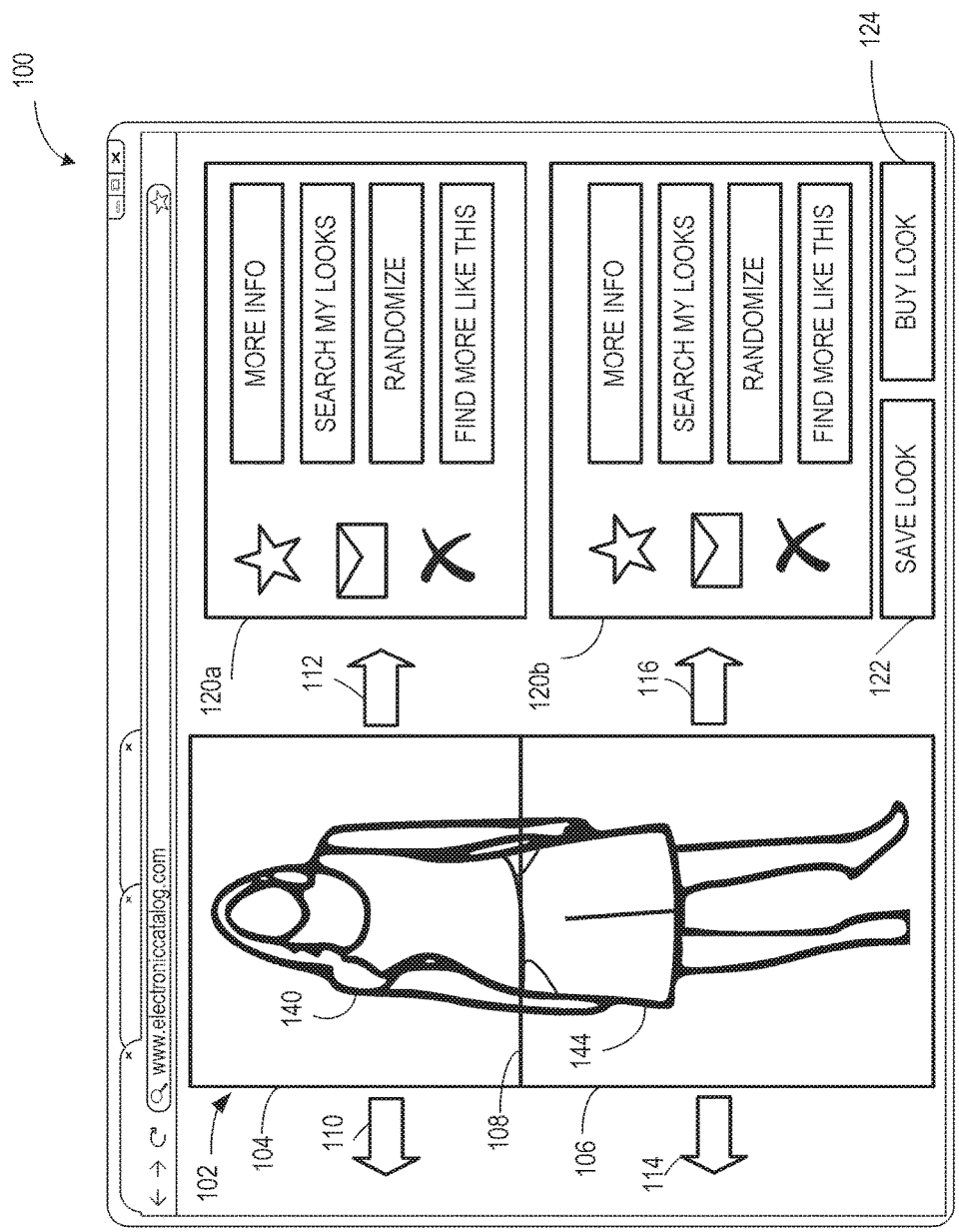
FIG. 1A is a pictorial diagram illustrating an example user interface generated at least in part by a browsing service, the user interface including an interactive browsing area showing a first item.

With the advent of digital imaging and the proliferation of image capturing systems, the number of images digitally captured continues to increase. One common type of image is a "selfie" or self-portrait image of a subject. The self-portraits are typically taken from a similar location e.g., an arms-length away) of the subject. The images may be stored locally on the image capturing system or remotely on a networked data store. The image capturing system may be implemented as a stand-alone device or with or within another access device such as within a television, a set-top-box, a mobile phone, a mirror, a door, a window, a dashboard display panel, an appliance, a video conferencing system, or the like. One example image capturing system is described in U.S. patent application Ser. No. 14/967,086 filed on Dec. 11, 2015 which is commonly owned and incorporated in its entirety herein.

Individually, the images captured by the image capturing system can be browsed to identify different looks of the subject over time. Described in further detail below are unique features that allow these disparate images to be combined such that a portion of a first image of a subject is viewable with a portion of a second image of the subject. For example, a first portion may be taken from an image of the subject wearing a golf shirt and long pants. A second portion may be taken from an image of the same subject wearing a long sleeved shirt and shorts. The first portion may show only the golf shirt and the second portion may show only the shorts thereby providing a depiction of what the subject would look like wearing the shirt shown in the first image with the shorts shown in the second image. The interface presents two portions of a subject, each portion selected from different data stores of images. The interface may provide a unified view of the portions. This presents a new way to browse a collection of images to identify new combinations of items to be worn together.

In one aspect, a user interface is described for presenting portions of two different images. In addition to displaying the images on the user interface, additional aspects are described for enhancing the display of the portions such that the display appears to show the subject as wearing an outfit for which no image actually exists. A browsing service may be provided to coordinate the user interface and image processing for displaying images therein.

Examples of the image processing implemented by the browsing service include automatic segmentation and alignment of images for display via an interface. The images may have different scales and lengths. As such, items shown in the images, such as clothing, may not be depicted in a uniform way. Segmentation of the images into image portions where an image portion shows a specific item is described. The segmentation may be achieved using models and/or complex image analysis as will be described below. To provide a realistic view of the subject when image segments are presented together on an interface, additional alignment of the image segments may be performed. The alignment may be achieved using models and/or complex image analysis as will be described below.

Although various embodiments are described with reference to subjects and items such as clothing, it will be understood that the systems, methods, and devices described may be configured for other subjects (e.g., non-human subjects) such as home décor, clothing, garments, vehicle, or mechanical devices and/or other items shown within the images (e.g., lamps, carpets, chairs, tables, sofas, floor mats, steering wheels, rims, tires, door panels, hinges, covers, keyboards, housing, etc.). As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

FIG. 1A is a pictorial diagram illustrating an example user interface generated at least in part by a browsing service, the user interface including an interactive browsing area showing a first item. The browsing service may be implemented on an access device presenting the user interface 100. In some implementations, the browsing service may be implemented on a catalog system in communication with an access device. In some implementations, the browsing service may be implemented as a distributed service with some functions implemented at the access device and some functions implemented on a catalog system. In a distributed configuration, it may be desirable to provide similar functions at both the access device and the catalog system to allow dynamic allocation of the processing between the access device and the catalog system. For example, if the access device is operating with limited resources (e.g., power, bandwidth, data storage, communication channel, etc.) it may be desirable to allocate processing to the catalog system until the resources for the access device are increased.

The user interface 100 includes an interactive image viewer 102. The interactive image viewer 102 shown in FIG. 1A is configured to present two image zones, an upper display zone 104 and a lower display zone 106. A partition 108 separates the upper display zone 104 and the lower display zone 106. Additional display zones may be included with corresponding partitions. As a non-limiting example, three display zones may be included with two partitions between respective display zones. Depending on the implementations, the display zones may be the same or different sizes. The partition 108 is shown as a horizontal partition. In some implementations, additional or alternative partitions may be included. For example, vertical partitioning may be used to divide an interactive image viewer for home décor whereby a first zone is provided for displaying an end-table and another zone is provided for displaying a couch. The partition 108 may be associated with partition information indicating where the partition 108 is located with reference to the interactive image viewer 102.

Each zone may display a portion of an image. As shown in FIG. 1A, the upper display zone 104 shows a first portion 140 of an image showing a subject. The first portion 140 of the image showing the subject in the example of FIG. 1A shows the head and trunk of a person. The lower display zone 106 shows a second portion 144 of an image showing the subject. The second portion 144 of the subject in the example of FIG. 1A shows the legs and feet of the person.

The first portion 140 and the second portion 144 may be taken from two different images. The images may be stored on the access device presenting the user interface 100 such as in internal memory of a smartphone. When the user interface 100 is initially loaded, two images may be selected from a data store of images to present in the zones of the interactive image viewer 102. The selection may be based on the date (e.g., select images taken more than a predetermined number of days ago), previous indicia of preference for images (e.g., images associated with more views are favored over images viewed less often), randomization, color of an item shown in the image, category of an item shown in the image (e.g., top, eveningwear, shirt, skirt, pants, shorts, etc.), or some combination thereof. In some implementations, the selection may also rely on information sensed or otherwise provided by the access device. For example, the access device presenting the user interface 100 may determine the temperature or season. If the access device determined the temperature was hot, it may be more appropriate to display warm weather clothing rather than skiing clothes. As another example, the access device may include a calendar which stores event information. The event information may indicate when and/or what type of event the user may be attending. When accessing the user interface 100 near the time of the event, the event information may be used by the browsing service to select images for display. For example, if the event was entitled "business meeting with James" the images showing professional wear may be selected. In contrast, if the event was entitled "dancing with friends," leisure or club-wear may be given preference during the selection process.

In some implementations, one or more of the images may be selected from a remote data store of images. For example, if the access device presenting the user interface 100 is connected to a network, the user of the access device may store images at a networked location such as a photo sharing internet site, social media site, or other network-accessible data storage service. In such implementations, the selection of an image from the remote data store of images may be further based on network connectivity, availability of the remote data store of images, resources available to the access device (e.g., if operating in low power mode or connected via a low bandwidth network connection, avoid selection from the remote source to conserve resources), or some combination thereof.

The data store of images need not be under control or ownership of the user. For example, the user interface 100 may be configured to connect to a data store of images belonging to a third-party user such as a friend or family member. In such implementations, the images of items worn by the third-party user may be browsed via the user interface 100. This can provide an advantage of allowing the user to find an item of clothing to borrow from the third-party user to complete an outfit.

In some implementations, the user interface 100 may obtain images from a catalog system. In such implementations, an image of an item available for purchase or other acquisition (lease, borrowing, gifting, etc.) may be selected and included in the interactive image viewer 102. Presenting such images can be useful in directing the user to new or alternative items they may be interested in acquiring by displaying them in conjunction with an item already owned by the user. For example, the first portion 140 may show the user wearing her favorite red shirt while the second portion 144 may show an image from a catalog system of a popular (e.g., among users of the catalog system) pair of white shorts. In some implementations, it may be desirable to provide a visual artifact for images showing items contained in a catalog system. For example, the white shorts may be displayed with a distinctive color outlining the item as shown in the image. This border may be color coded to visually associate the item shown in the user interface 100 with the catalog system offering the item. In such implementations, multiple catalog systems may be configured as image data sources. Through the use of distinct indications, the user interface 100 can quickly represent the source of a given item image. Other examples of visual artifacts that may be included in the alternative, or in addition to, another visual artifact include: a visible highlight, an icon, letters, numbers, color tone, or color filter. In some implementations, the images showing items from a catalog system may be further indicated using non-visual indications such as sound or vibration (e.g., haptic feedback).

As shown in FIG. 1A, the user interface 100 may include one or more control elements (e.g., buttons; clickable images; hyperlinks). A control element can be activated (e.g., clicked, selected, tapped, verbally identified, etc.) to cause a message to be transmitted to the browsing service coordinating the user interface 100. One example of such a control is a "buy look" button 124. Upon activation of the buy look button 124, the user may be presented with an interface to purchase one or more items shown in the interactive display area (e.g., interactive image viewer 102) that may be provided by a catalog system. The activation may cause the browsing service to transmit information to the catalog system. The information transmitted may identify the item(s) shown in the image(s) provided by the catalog system. This information may be used by the catalog system and/or browsing service for initiating the acquisition. In some implementations, information about the user may also be provided to the catalog system. For example, the user may be associated with an account number within the catalog system. When the buy look button 124 is activated, this account number may be transmitted to the catalog system to facilitate retrieval of user information needed to complete the transaction for an item.

Browsing controls are also shown in FIG. 1A. The browsing controls may be associated with a display zone. For example, browsing control 110 and browsing control 112 are associated with the upper display zone 104 while browsing control 114 and browsing control 116 are associated with the lower display zone 104. When a browsing control is activated, the browsing control causes the image data shown in the associated display zone to change. In some implementations, the change may include animated motion for the image data in the indicated direction. For example, when the browsing control 110 is activated, the image shown in the upper display zone 104 is scrolled off the upper display zone 104 and replaced with a new image.

As portions of images are displayed in display zones, it may be desirable to align the portions such that a realistic, continuous view of the subject is shown. Segmentation and/or alignment of the images may be performed by the browsing service to automatically adjust the portions of images shown via the interactive image viewer 102. In some implementations, the interactive image viewer 102 may also receive specific adjustments for a display zone. For example, the user may drag the first portion 140 within the upper display zone 104 to more closely align the first portion 140 shown with the second portion 144 shown in the lower display zone 106. This adjustment may be stored by the browsing service and used when presenting and/or aligning future image portions. Segmentation and alignment features will be described in further detail below.

Figure 1B:
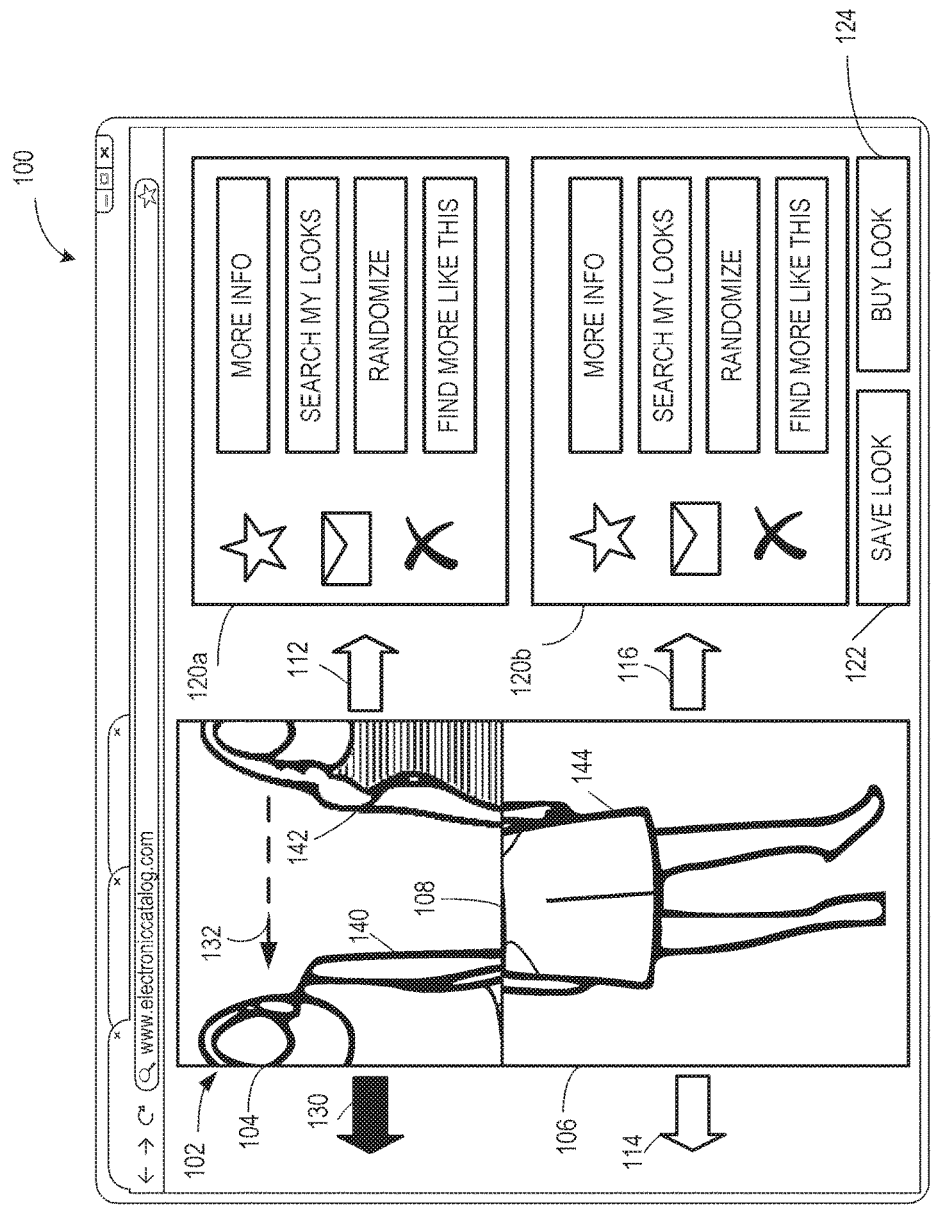
FIG. 1B is a pictorial diagram illustrating the example user interface of FIG. 1A with an activated browsing control.

FIG. 1B is a pictorial diagram illustrating the example user interface of FIG. 1A with an activated browsing control. An activated browsing control 130 is shown in FIG. 1B. Upon activation, the first portion 140 of the subject is moved in a direction 132 associated with the activated browsing control 130. In FIG. 1B, the direction 132 is to the left of the user interface 100. As the first portion 140 is moved left, a replacement portion 143 is displayed in the upper display zone 104. In some implementations, the rates that the first portion 140 is moved and a replacement third portion 142 is displayed are equal.

Figure 1C:
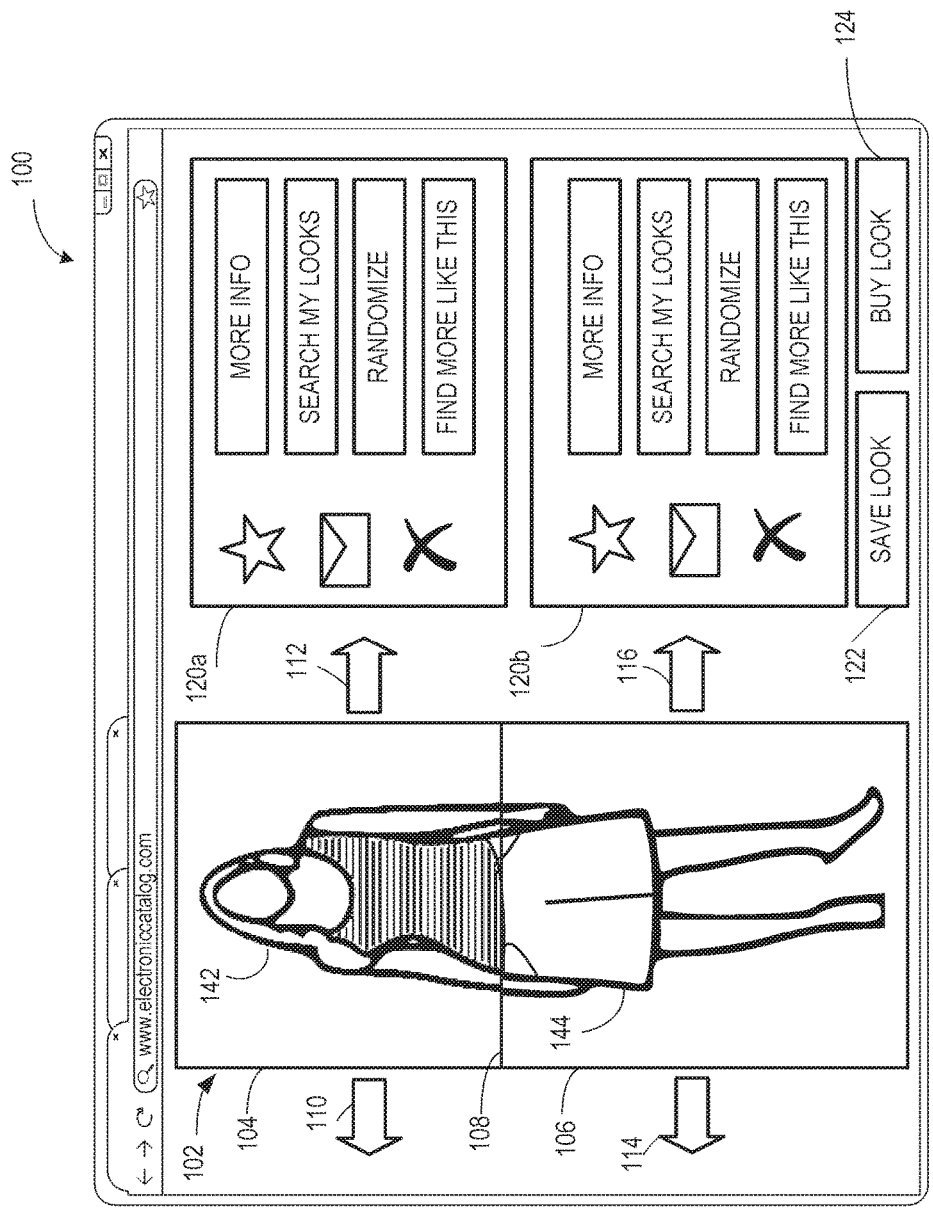
FIG. 1C is a pictorial diagram illustrating the example user interface of FIG. 1A after activation of a browsing control.

FIG. 1C is a pictorial diagram illustrating the example user interface of FIG. 1A after activation of a browsing control. The browsing control 110 is shown in the non-activated form, similar to how the browsing control 110 appears in FIG. 1A. The interactive image viewer 102 now displays the replacement portion, the third portion 142, from a first image in the upper display zone 104 with the second portion 144 from a different image than the first image in the lower display zone 106. As shown, the interactive image viewer 102 provides a complete view of the subject using image data from two distinct images. In some implementations, the user may browse the images using the interactive image viewer 102 to discover new combinations of looks. This allows the user interface 100 to present hypothetical looks for the user for which no single image exists in an images source.

As the user adjusts the interactive image viewer 102, a combination of image portions may be displayed that the user wishes to save. A "save look" control 122 may be included in the user interface 100. Upon activation, the save look control 122 may transmit information to the browsing service indicating the current state of the interactive image viewer 102. The current state information, when provided to the browsing service, includes the information for the browsing service to recreate the user interface 100 at the time the save look control 122 was activated. The current state information may include one or more of: identifiers of the images shown, sources for the images shown, the location of the partition 108, or the location of image portions within a display zone. The current state information may be stored using a session record. The session record may be associated with a record identifier. Using the record identifier, the browsing service may retrieve the session record and restore the user interface 100 to its state at the time when the save look control 122 was activated.

The user interface 100 may include additional controls that, when activated, cause the interactive image viewer 102 and/or the user interface 100 to change state. In the examples shown in FIGS. 1A, 1B, and 1C, an upper control panel 120*a* may be associated with the upper display zone 104 and a lower control panel 120*b* may be associated with the lower display zone 106. In such implementations, activation of a control within the control panel implies activation for the associated display zone. For example, if a "more info" control is activated from the lower control panel 120*b*, more information related to the portion of the image shown in the lower display zone 106 may be retrieved and presented via the user interface 100. If the image was retrieved from a local image store (e.g., data store of the access device presenting the user interface 100), the additional information may include metadata for the image such as time the image was taken or location information indicating where the image was taken. If the image was retrieved from a catalog system, the additional information may include, for example: an identifier of the catalog system, details about an item shown in the image such as available sizes, colors, or patterns, pricing information for an item shown in the image, user reviews of an item shown in the image, textual information about an item shown in the image, or availability of an item (e.g., in stock at a local store; available for shipping if ordered within a period of time).

Another example control that may be included in the upper control panel 120*a* or the lower control panel 120*b* is a "search my looks" control. The search my looks control may initiate a search for images of the user. Activating the search my looks control may include initiating a search with search criteria taken from the image or portion shown in the corresponding zone. For example, activation of the search my looks control in the upper control panel 120*a* for the user interface 100 shown in FIG. 1C may initiate a search for images showing the user wearing an items similar to that shown in the upper display zone 104 (e.g., a top or a striped top). In some implementations, the user interface 100 may also display a criteria entry control upon activation of the search my looks control. The criteria entry control may be configured to receive values to further refine the search such as limiting the search by date, color, item type (e.g., category), or other criteria.

Once the search is executed, the search results may be provided via the user interface 100. One way the search results may be provided is through the interactive image viewer 102. In such an implementation, the images identified in the search results can be used as the set of images for display in the corresponding display zone. A visual indication that the search results are being used as the data store of images for the display zone may be provided. One example of such a visual indication may include overlaying an image on a portion of the display zone. Another way the search results may be provided is through a listing. The listing may include sorted or unsorted images at least partially matching the specified search criteria. An image within the listing may be selected and, upon selection, presented via the corresponding display zone in the interactive image viewer 102.

Another example control that may be included in the upper control panel 120*a* or the lower control panel 120*b* is a "randomize" control. The randomize control, when activated, may cause the browsing service to randomly or pseudo-randomly identify an image for presentation via the corresponding display zone. For example, if the randomize control in the lower control panel 120*b* is activated, the browsing service may randomly or pseudo-randomly select an image from a data store of images for the lower display zone 106. The selection may include generating a pseudo-random value and then identifying an image from the data store of images using the pseudo-random value.

In some implementations the selection may also include randomly or pseudo-randomly selecting a data store of images. For example, the browsing service may first identify which source/sources of images to use (e.g., access device data store of images, third-party data store(s) of images, and/or catalog system(s)) and then identify an image from the identified source. Upon activation of the randomize control, the corresponding display zone may display a visual indicator during the selection process. For example, when the randomize control associated with the upper display zone 104 is activated, the upper display zone 104 may show a blurred sequence of images to provide feedback on the status of the requested action. Sound or other feedback may be presented via the user interface 100 or the access device presenting the user interface 100.

Another example control that may be included in the upper control panel 120*a* or the lower control panel 120*b* is a "find more like this" control. The find more like this control, when activated, may cause the browsing service to search a catalog system for images showing items related to those shown in the portion displayed in the associated display zone. For example, if the find more like this control in the upper control panel 120*a* is activated, the portion of the subject shown in the upper display zone 104 may be provided as a search criteria included in a catalog search request for transmission to a catalog system.

Once the catalog search is executed, the search results may be provided via the user interface 100. One way the catalog search results may be provided is through the interactive image viewer 102. In such an implementation, the images identified in the catalog search results can be used as the set of images for display in the corresponding display zone. A visual indication that the catalog search results are being used as the data store of images for the display zone may be provided. One example of such a visual indication may include overlaying an image on a portion of the display zone. Another way the catalog search results may be provided is through a listing. The listing may include sorted or unsorted images at least partially matching the specified catalog search criteria. An image within the listing may be selected and, upon selection, presented via the corresponding display zone in the interactive image viewer 102.

Activating a control may include interacting with a region of the user interface 100. For example, in one implementation of the user interface 100, the browsing controls 110, 112, 114, and 116 may be omitted as displayed control elements. In such implementations, an interaction (e.g., gesture) may be detected within the user interface 100 or a portion thereof, such as the interactive image viewer 102 or one of the display zones. The interaction may be associated with a threshold indicating a level of interaction that will activate a system response. For example, a finger swipe in the upper display zone 104 having a low touch pressure and/or short distance as compared to the width of the upper display zone 104 may be below the threshold. Such a swipe may be accidental or incidental and not expressive of an image browsing intent by the user. If the finger swipe has a higher touch pressure and/or longer distance as compared to the width of the upper display zone 104, the swipe may indicate an intention of the user to change the image shown in the upper display zone 104. In the case of a swipe interaction, the swipe may include both a magnitude (e.g., pressure or distance) as well as a direction (e.g., left-to-right swipe; right-to-left swipe; top-to-bottom swipe; bottom-to-top swipe). The interaction information, if exceeding the threshold, may be used to identify how to adjust the display zone. For instance, a left-to-right swipe in the upper display zone 104 may change the user interface 100 as shown in FIG. 1B. Other examples of interactions may include tapping the access device, shaking the access device or an input coupled thereto, selecting a location of the user interface 100, detecting a spoken command through speech recognition, or the like.

The control panel may include a preference control configured to receive preference input information for the image and/or item shown in the respective display zone. As shown in FIG. 1A, the preference control may be implemented using an image such as a star. When the preference control is activated, the browsing service may receive an indication of the image and/or item shown in the corresponding display zone. This preference may be stored with the image or in a browsing service data store. The preference may be used to help dynamically direct the selection of images to display in the interactive image viewer 102. For example, the preference information may be used to organize search results such that images or items with an indicated preference are presented before images or items with no preference indication. The preference information may be used to weight the randomization such that images or images showing items that are favored have a higher chance of being displayed as compared to those with no preference association.

The control panel may include a sharing control configured to transmit information about the image and/or item shown in the respective display zone to a third party. As shown in FIG. 1A, the sharing control may be implemented using an icon such as an envelope. When the sharing control is activated, the browsing service may receive an indication of the image and/or item shown in the corresponding display zone. A message may be transmitted to a third party indicating the image and/or item shown in the respective display zone. For example, if a user wants to show a new item to friends via a social media service, activating the sharing control may adjust the user interface 100 to receive the information needed to post the image to the social media service. Other sharing options may include emailing, text messaging, instant messaging, messaging to another access device configured to display another instance of the user interface, or the like.

The control panel may include a delete control configured to transmit information about the image and/or item shown in the respective display zone to the browsing service for deletion. As shown in FIG. 1A, the delete control may be implemented using an icon such as a stylized letter X. The deletion may cause the browsing service to delete the image from the data store of images. In some implementations, the deletion may not remove the image from the data store of images, but may include the identified image in create a record of images the browsing service to remove the image from further consideration by the browsing service, but retain the image in the data store of images.

In FIGS. 1A, 1B, and 1C, the user interface 100 is shown in the context of a tabbed internet browser. In some implementations, the user interface 100 may be presented via a stand-alone client including similar, additional, or fewer controls. The quantity and type of controls may be dependent on the capabilities of the access device rendering the user interface 100. For example, if the access device includes a touchscreen, button controls may be omitted in favor of corresponding gesture controls. In one implementation, the user interface 100 may present only the interactive image viewer 102. Additional controls, such as those shown in FIG. 1A, 1B, or 1C, may be presented through an interaction with the user interface 100. For example, a portion of the interactive image viewer 102 may be activated (e.g., clicked, tapped, etc.) to cause presentation of a control panel.

Figure 2:
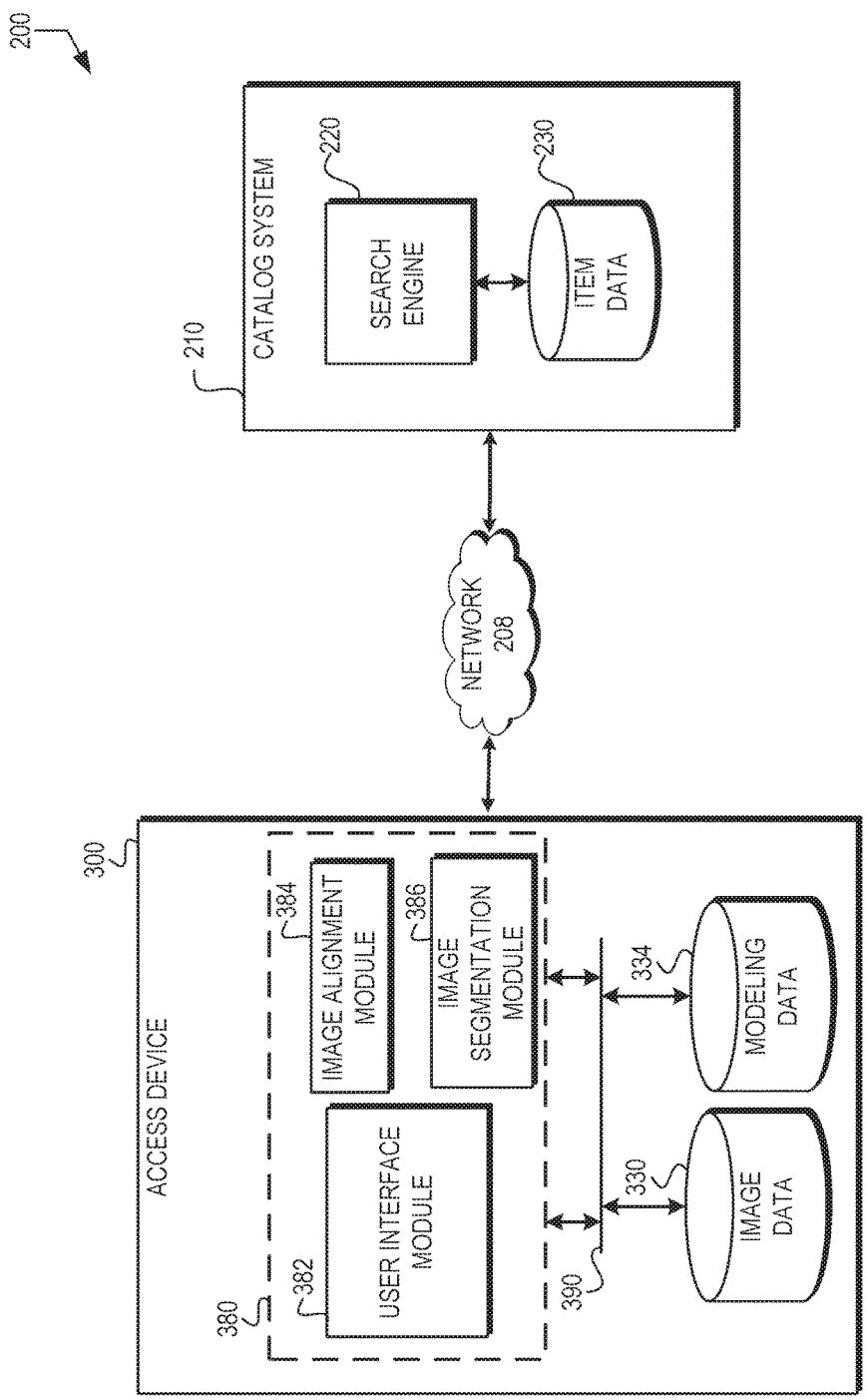
FIG. 2 is a block diagram showing an illustrative operating environment in which the an access devices providing a browsing service enables a user to browse catalog system via user interfaces such as those depicted in FIGS. 1A, 1B and 1C.

FIG. 2 is a block diagram showing an illustrative operating environment 200 in which the an access devices providing a browsing service enables a user to browse catalog system via user interfaces such as those depicted in FIGS. 1A, 1B and 1C. The environment 200 may include a catalog system 210. The catalog system 210 may be included to provide a central repository of items that can be accessed by users. The catalog system 210 may provide functionality for users to, e.g., interactively browse, search for, review, rate, tag, purchase (or otherwise acquire), sell or obtain recommendations of, catalog items such as appliances, electronics, books, clothing, jewelry, and the like. Examples of such systems are described in greater detail, e.g., in U.S. Pat. Nos. 7,685,074; 7,472,077; and 8,122,020, each of which is incorporated herein by reference in its entirety.

The catalog system 210 may be organized to allow certain users to add or update item entries in the catalog system 210. The entries may be stored in item data store 230. Adding or modifying entries affects which items have information (e.g., description, color, different images) that is eligible to be searched and presented by the catalog system 210. For example, the catalog system 210 may include a collection of information about items offered for sale via the Internet. In some implementations, the users initiating transfer of information about an item may transmit the item information from a remote device for loading into the catalog system 210. Once included in the catalog system 210, a user may search the catalog system 210 to obtain the item data from the item data store 230.

As shown, an access device 300 may transmit a catalog search request to a catalog system 210 via a network 208. The access device 300 may be an electronic communication device configured to transmit machine readable messages to the catalog system 210. Non-limiting examples of the access device 300 include a personal computing device, laptop computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance. The messages may be formatted according to a standardized protocol such as TCP/IP, HTTP, FTP, or the like. The transmission may be sent wired, wireless, or hybrid wired-wireless networks.

The catalog search request may include text input such as a search query term. In other embodiments, the catalog search request may include audio data representing an utterance from a user. In some implementations, the catalog search request may be an image search and include image data from one or more display zones of the user interface 100.

A search engine 220 included in the catalog system 210 may receive the catalog search request. The search engine 220 may be configured to search for items included in the item data store 230 using the criteria specified in the catalog search request. For example, if the catalog search request includes audio data, the search engine 220 may be configured to obtain a transcription of the audio from an automatic speech recognition system. Using the transcription or, in the case where the search query term is provided in textual form in the catalog search request, the search engine 220 may identify items in the item data store 230. The identification may be a literal identification (e.g., exact match between item data and the catalog search request). The identification may be a partial match (e.g., words with similar stems or synonyms matching). In some implementations, the search may be executed against an index of the item data store 230.

As items are identified, the information about the items may also be retrieved from the item data store 230. The information about an item may include one or more images for the item, textual description of the item, user reviews of the item, manufacturer information for the item, a catalog identifier uniquely identifying the item within the catalog system, and the like. The information about the items identified may be provided by the search engine 220 as a search result. The search result, in some implementations, may be transmitted to the access device 300. Accordingly, items can be searched and accessed from an item catalog stored in the item data store 230 via the catalog system 210.

The access device 300 may include a browsing service 380. The browsing service 380 may be configured to provide the user interface 100 and receive activation information from controls thereon, such as those described with reference to FIGS. 1A, 1B, and 1C. A user interface module 382 may be included in the browsing service 380. The user interface module 382 may be configured to generate the user interface 100, receive activation information, and execute the browsing functions indicated by respective activations. This may include retrieving images from an image data store 330 included in the access device 300. As discussed above, it may be desirable to ensure proper alignment of the portions of images within and amongst display zones. An image segmentation module 386 and an image alignment module 384 may be included in the browsing service 380 to support the alignment of the images. The image segmentation module 386 may be configured to segment images into respective portions. The segmentation may be based on modeling information stored in a modeling data store 334. The image alignment module 384 may be configured to vertically and/or horizontally align the portions of images identified for presentation in respective display zones. The alignment may be based on modeling information stored in the modeling data store 334. In some implementations, the image alignment module 384 may be configured to align images which have been segmented by the image segmentation module 386.

In some implementations, one or more elements of the browsing service 380 may be accessed via the network 208 rather than being implemented with the access device 300. Similarly, an image data source such as the image data store 330 and/or the modeling data store 334 may be accessible by the access device 300. For example, the modeling data may be stored within the catalog system 210 and accessed by the access device 300 via the network 208.

The elements included in the access device 300 may be coupled by a bus 390. The bus 390 may be a data bus, communication bus, or other bus mechanism to enable the various components of the access device 300 to exchange information.

Figure 3:
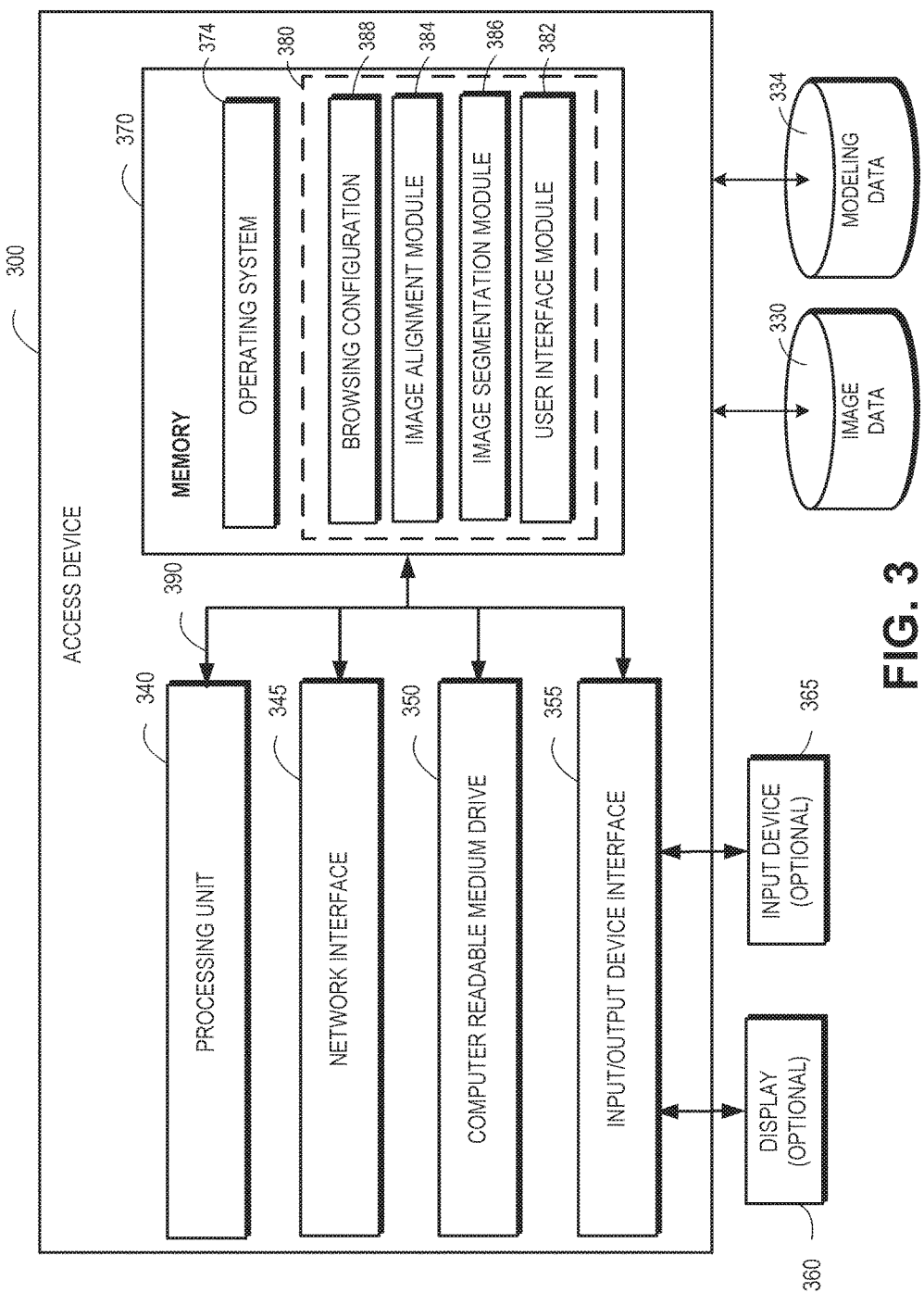
FIG. 3 depicts a general architecture of an example access device providing a browsing service for efficient and interactive browsing of items and/or images maintained by the catalog system shown in FIG. 2.

FIG. 3 depicts a general architecture of an example access device 300 providing a browsing service for efficient and interactive browsing of items and/or images maintained by the catalog system shown in FIG. 2. The access device 300 can include a processing unit 340, a browsing service 380, a network interface 345, a computer readable medium drive 350, an input/output device interface 355, and a memory 370. The network interface 345 can provide connectivity to one or more networks or computing systems. The processing unit 340 can receive information and instructions from other computing systems or services via the network interface 345. The network interface 345 can also store data directly to memory 370. The processing unit 340 can communicate to and from memory 370 and output information to an optional display 360 via the input/output device interface 355. The input/output device interface 355 can also accept input from the optional input device 365, such as a keyboard, mouse, digital pen, microphone, mass storage device, touch screen, gesture recognition system, voice recognition system, image recognition through an imaging device (which may capture eye, hand, head, body tracking data and/or placement), gamepad, accelerometer, gyroscope, or other input device known in the art. One example of an input is a swipe received via a touch screen. Another example of an input is an activation via a mouse click on a control included in the user interface 100.

The memory 370 may contain specific computer-executable instructions that the processing unit 340 or other computing device in communication with the data store can execute in order to implement all or a portion of one or more embodiments. The memory 370 may include RAM, ROM, and/or other persistent, non-transitory computer readable media. The memory 370 can store an operating system 374 that provides computer program instructions for use by the processing unit 340 or other elements included in the access device in the general administration and operation of the access device 300. The memory 370 can further include computer program instructions and other information for implementing aspects of the present disclosure.

For example, in one embodiment, the memory 370 includes instructions for the browsing service 380. The instructions may include specific instructions for the image alignment module 384, the image segmentation module 386, and the user interface module 382. The memory may also include a browsing configuration 388. The browsing configuration 388 may include the thresholds, data store of images information, user information for accessing a catalog system, or other configuration values described. The browsing configuration 388 may store specific values for a given configuration parameter such as the interaction threshold for activating a control element. The browsing configuration 388 may, in some implementations, store information for obtaining values for a given configuration element. For example, a control interaction threshold or remote data stores of images may be specified as a network location (e.g., URL) in conjunction with username and password information to access the network location to obtain the control interaction threshold or list of remote data stores of images. The memory 370 may also include or communicate with one or more auxiliary data stores, such as the image data store 330 or the modeling data store 334.

The elements included in the access device 300 may be coupled by the bus 390. The bus 390 may be a data bus, communication bus, or other bus mechanism to enable the various components of the access device 300 to exchange information.

In some embodiments, the access device 300 may include additional or fewer components than are shown in FIG. 3. For example, an access device 300 may include more than one processing unit similar to the processing unit 340 and/or more than one computer readable medium drive similar to the computer readable medium drive 350. In another example, the access device 300 may not be coupled to a display 360 or an input device 365. In some embodiments, two or more access devices may together form a computer system for executing features of the present disclosure.

Figure 4:
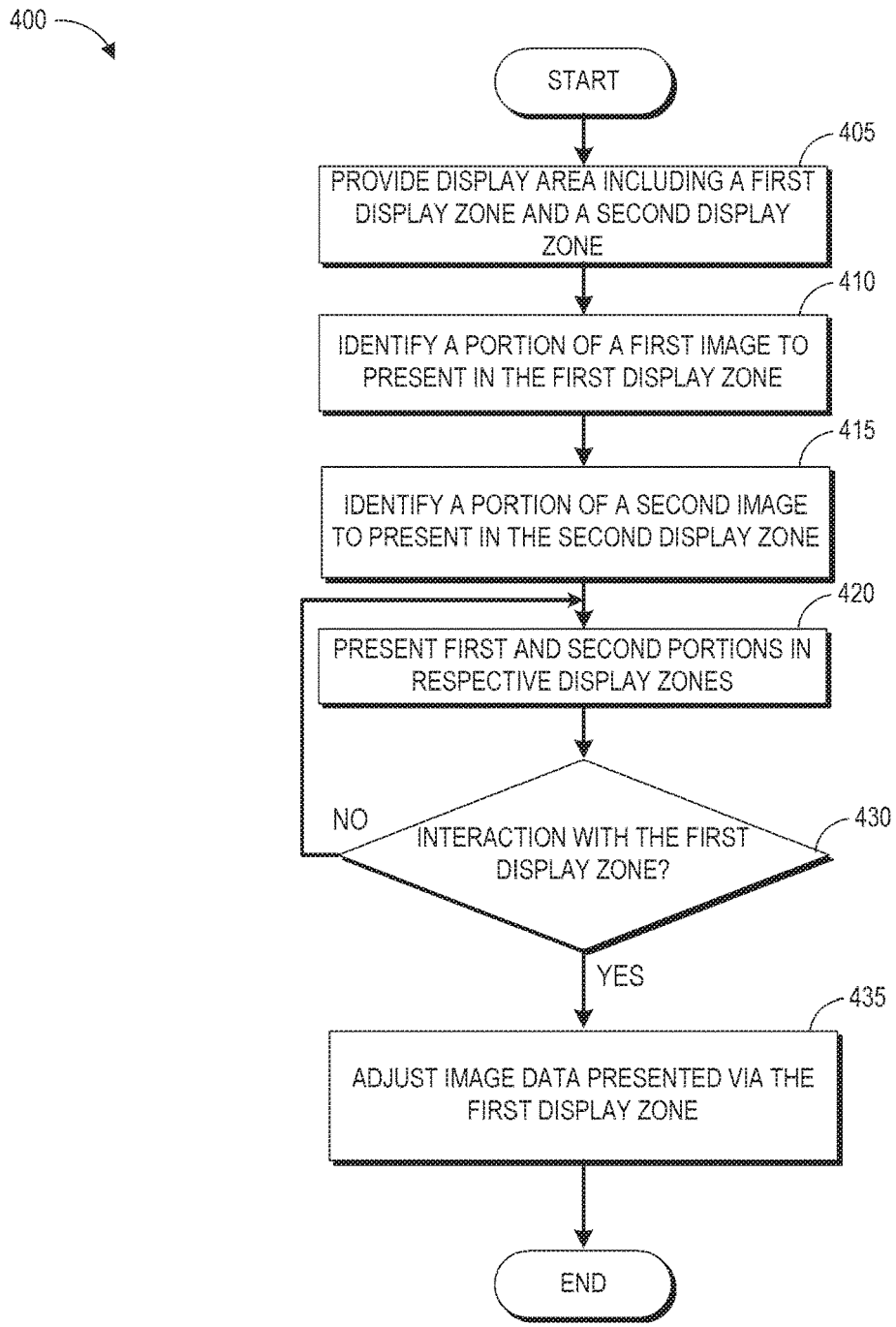
FIG. 4 is a flow diagram depicting an example method implemented in the catalog system for browsing item images.

FIG. 4 is a flow diagram depicting an example method implemented in the catalog system for browsing item images. The method 400 shown in FIG. 4 may be implemented in whole or in part by the devices described herein such as the user interface module 382 of the access device 300 shown in FIGS. 2 and 3.

The method 400 begins at block 405 where a display area including a first display zone and a second display zone is provided. A non-limiting example of a display area is the interactive image viewer 102, such as that shown in FIG. 1A, 1B, or 1C. Providing the display area may include rendering a user interface including the first display zone and the second display zone. The user interface may be similar to the user interface 100 shown in FIG. 1A, 1B, or 1C. At block 410, a portion of a first image is identified to present in the first display zone. The first image may be identified randomly or semi-randomly. The first image may be identified from a data store of images included in the device providing the display area. In some implementations, the first image may be identified from a networked data store of images accessible from the device providing the display area via a network connection. As part of identifying the first image, a portion of the first image may also be identified for presentation. The portion may be identified based on an amount of the display area allocated to the first display zone. For example, if the first display zone is allocated 30% of the display area, 30% of the image may be identified as the portion for presenting. The first portion may be identified by segmenting the first image as described in further detail below.

At block 415, a portion of a second image is identified to present in the second display zone. As with the first image, the second image may be identified randomly or semi-randomly. The second image may be identified from a data store of images included in the device providing the display area. In some implementations, the second image may be identified from a networked data store of images accessible from the device providing the display area via a network connection. The second image may be identified from a different data store of images than the first image. As part of identifying the second image, a portion of the second image may also be identified for presentation. The portion may be identified based on an amount of the display area allocated to the second display zone. For example, if the second display zone is allocated 70% of the display area, 70% of the image may be identified as the portion for presenting. The second portion may be identified by segmenting the second image as described in further detail below.

At block 420, the first portion of the first image and the second portion of the second image are displayed in their respective display zones. In some implementations, block 420 may include causing display of the first portion of the first image and the second portion of the second image in their respective display zones. The display may be caused through one or more messages transmitted between, for example, the access device 300 and the catalog system 210. Displaying the portions may include rendering the portion of the images on a display device. Displaying the portions may also include aligning the portions to form a continuous view of the subject. Alignment features are discussed in further detail below.

At block 430, a determination is made as to whether an interaction was detected within the first display zone. The determination may include monitoring the first display zone for an input that exceeds an interaction threshold. The determination may include detecting activation of a control associated with the first display zone. If the determination at block 430 is negative, the method 400 returns to block 420 to continue presenting the first portion and the second portion. If the determination at block 430 is affirmative, the method 400 proceeds to block 435.

At block 435, image data presented via the first display zone is adjusted. The adjustment may be based on the type of interaction detected. For example, if the interaction was a swipe gesture across the upper display zone 104 shown in FIG. 1B from right-to-left of the upper display zone 104, the adjustment may include removing the first portion from the first display zone from right to left such that the first portion 140 is no longer the only portion of the subject shown in the upper display zone 104. The adjustment may also include replacing the first portion with a replacement portion of a third image. As shown in FIG. 1B, the third portion 142 is entering the upper display zone 104. The replacement portion may be selected randomly or pseudo-randomly from an image store. The replacement portion may also be rendered from right to left as the first portion is removed from the first display zone.

If the type of interaction detected was an image adjustment, the first portion may be moved within the first display zone in proportion to the magnitude of the interaction. For example, the user may wish to manually align the first portion 140 with the second portion 144 shown in FIG. 1A or move one or both portions to provide a more aesthetically accurate view of the whole subject. The interaction may include a drag within the first display zone (e.g., the upper display zone 104) indicating the direction and amount of movement to apply to the first portion (e.g., the first portion 140). The method 400 may end with the adjustment of the display area in response to the detected interaction. All or a portion of the method 400 may be repeated with the replacement portion and second portion to allow further browsing and interaction via the user interface.

Segmentation may be used to identify the portion of an image to present via a display zone. In the example implementation for clothing, an image of a person may show the person wearing various items. As such, it may be desirable to segment images to identify each category of item shown in an image. One way to segment an image is to use a structural model.

Figure 5C:
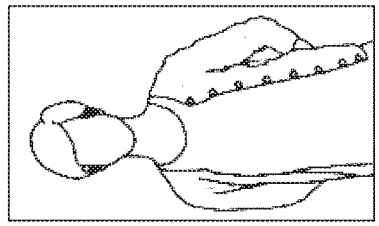
FIG. 5C shows a portion of the image shown in FIG. 5B segmented to show the portion of the image corresponding to the trunk and head of the subject.
Figure 5D:
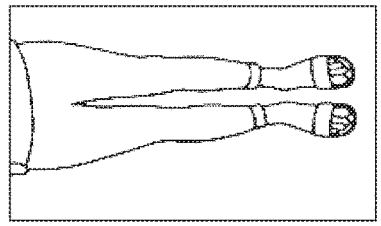
FIG. 5D shows a portion of the image shown in FIG. 5B segmented to show the portion of the image corresponding to the legs of the subject.
Figure 5B:
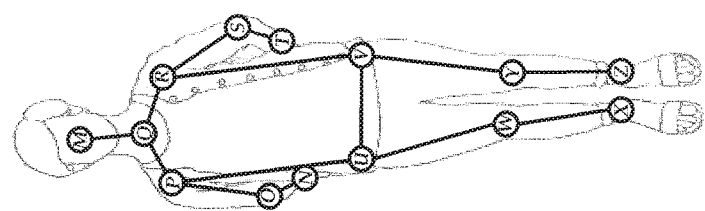
FIG. 5B is a pictorial diagram of the image in which the subject appears, which image is mapped with the structural model of FIG. 5A.
Figure 5A:
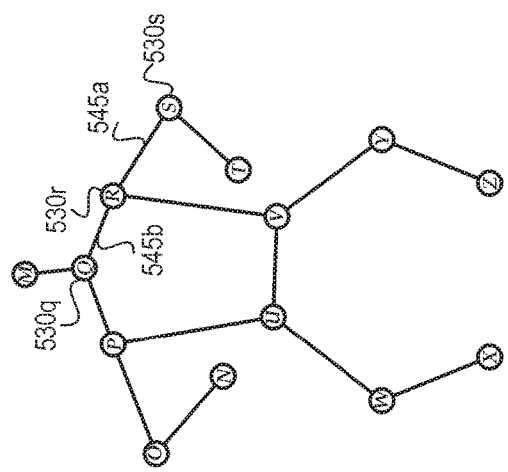
FIG. 5A is a pictorial diagram of an illustrative structural model for a subject appearing in an image.

FIG. 5A is a pictorial diagram of an illustrative structural model for a subject appearing in an image. The image in FIG. 5A also includes fourteen structural reference points labeled M through Z. For example, structural reference 530r is structural reference point R located approximately at the left shoulder of the subject 120. Each of the structural references shown in FIG. 5A also includes at least one path to another structural reference. For example, the structural reference 503r has a path 545a to structural reference 530s and another path 546b to structural reference 530q. Each path is associated with a distance indicating an amount of space between the nodes (e.g., structural references) connected by the path. The collection of structural references and paths form a structural graph for the subject. Where the subject is a human, the structural graph may be referred to as a skeletal model.

FIG. 5B is a pictorial diagram of the image in which the subject appears, which image is mapped with the structural model of FIG. 5A. The mapping may be performed by acquiring the structural graph for the subject, such as from the modeling data store 334. Using data in the image of the subject, the nodes of the structural model may be mapped to locations on the image. The locations may be identified by comparing depth information for pixels included in the image with the node values for the structural model. In some implementations, feature detection may be used to identify locations for placing the nodes of the structural model. For example, facial recognition may be used to identify the face of the subject as shown in the image. Once identified, the node M may be placed at the identified location.

Once the structural graph is mapped onto the image, collections of nodes may be associated with different segments of the subject shown. For example, the nodes X, W, U, V, Y, and Z map to a portion of the image showing the legs of the subject. The collections of nodes and associations with segments may be stored in a data store accessible by the image segmentation module 386. In some implementations, the node collections may be stored in association with the structural graph.

The image may be segmented into portions based on a desired segment to be presented via the interactive image viewer 102. For example, if the image is selected for inclusion in the upper display zone 104, a portion of the image showing the upper half (e.g., trunk and head) of the subject may be needed.

FIG. 5C shows a portion of the image shown in FIG. 5B segmented to show the portion of the image corresponding to the trunk and head of the subject. Similarly, if the image is to be shown in the lower display zone 106, a portion of the image showing the lower half (e.g., legs) of the subject may be needed.

FIG. 5D shows a portion of the image shown in FIG. 5B segmented to show the portion of the image corresponding to the legs of the subject. Further details of structural models and image segmentations are provided in U.S. patent application Ser. No. 14/729,894 filed on Jun. 3, 2015 which is commonly owned and incorporated by reference in its entirety.

Another way to segment images is via a ratio model. A ratio model generally defines regions within an image where expected portions (e.g., body parts) of a subject may be located. The regions may be indicated as bounding boxes. In some implementations, ratio model may be expressed as percentages such that the 1/5 of the image is generally shows the head of the subject, the next 2/5 of the image shows the trunk, and the remaining 2/5 shows the legs.

Figure 6A:
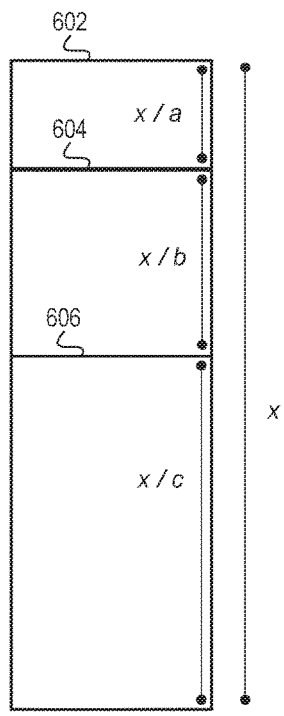
FIG. 6A depicts an illustrative ratio model for segmentation.

FIG. 6A depicts an illustrative ratio model for segmentation. The ratio model shown includes three segments 602, 604, and 606. The height of the ratio model is shown as x. Each portion may be defined as a part of the total size of the display area (e.g., height x). The sizes of the portions may be determined using machine learning techniques. For example a set of manually segmented images may be provided to train a segmentation model to identify ideal sizes for segmenting images not previously processed by the system. The training may also include consideration of image data such as the gender of a subject shown, race of the subject shown, body type of the subject shown, or location where the image was captured.

The sizes of the portions may be determined using image recognition techniques whereby the subject calibrates the ratio model by standing in a predetermined pose and analyzing the location of specific image features (e.g., neck, face, hands, hips, feet, etc.). The sizes of the portions may be determined via the user interface 100. For example the user may access a configuration interface that allows customization of how images should be segmented for their specific body type. The configuration interface may include adjustable segmentation lines which may generally correspond with partition boundaries in the interactive image viewer 102.

Figure 6B:
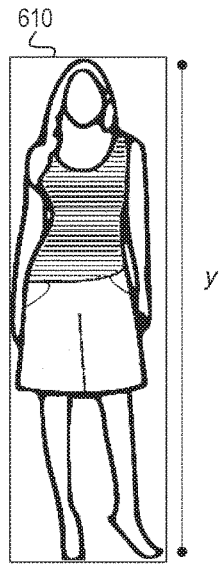
FIG. 6B depicts an image input for segmentation using the ratio model of FIG. 6A.

FIG. 6B depicts an image input for segmentation using the ratio model of FIG. 6A. As shown in FIG. 6B, the input image 610 is not the same height as the ratio model. Accordingly, to apply the ratio model, the input image is first normalized to the same height as represented in the ratio model. The normalization may include receiving image data, including in some implementations depth information, and adjusting the received image to provide a normalized image.

Figure 6C:
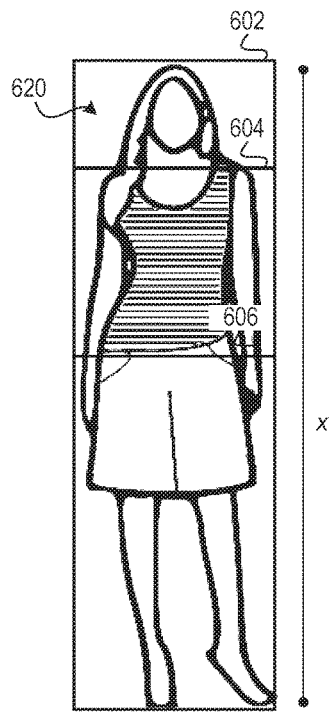
FIG. 6C depicts a normalized image generated with the ratio model of FIG. 6A.

FIG. 6C depicts a normalized image generated with the ratio model of FIG. 6A. The normalized input image 620 is the same height as the ratio model. As such, the height information for each portion of the input image may be used to divide the normalized input image. Portions included in the ratio model may be associated with a particular feature of the subject. As shown in FIG. 6C, the ratio model includes segment 602 showing the head, segment 604 showing the trunk, and segment 606 showing the legs.

Figure 6D:
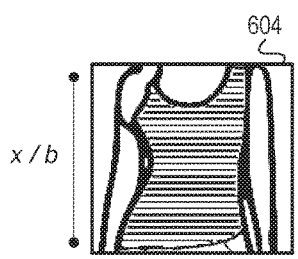
FIG. 6D shows a portion of the image segmented to show the portion of the image corresponding to the trunk of the subject.

One or more of the segments identified using the ratio model may be provided for display via the interactive image viewer 102. For example, where three display zones are used, the display zone for the trunk may use the portion of the normalized input image shown in FIG. 6D. FIG. 6D shows a portion of the image segmented to show the portion of the image corresponding to the trunk of the subject.

A ratio model and a structural model are two examples of model driven image segmentation. Other image segmentation models may be used to generate image segments. For example, computer vision models may be used to process images to identify features (e.g., garments, body part) shown therein. One example of a computer vision model is a neural network model. The neural network model may be trained on annotated image data whereby the annotations indicate features of interest. The neural network model may consider each pixel in the image and assign the pixel to a feature. As the annotated images are processed by the neural network model to generate predicted features, the predictions are compared to the annotated features. The parameters of the model may be adjusted such that the predictions more closely align with the annotated features. Once the neural network model is trained, unknown images may be processed to identify segments for the image. Other computer vision techniques that may be used for segmentation include object localization, semantic segmentation, edge detection, and the like.

Figure 7:
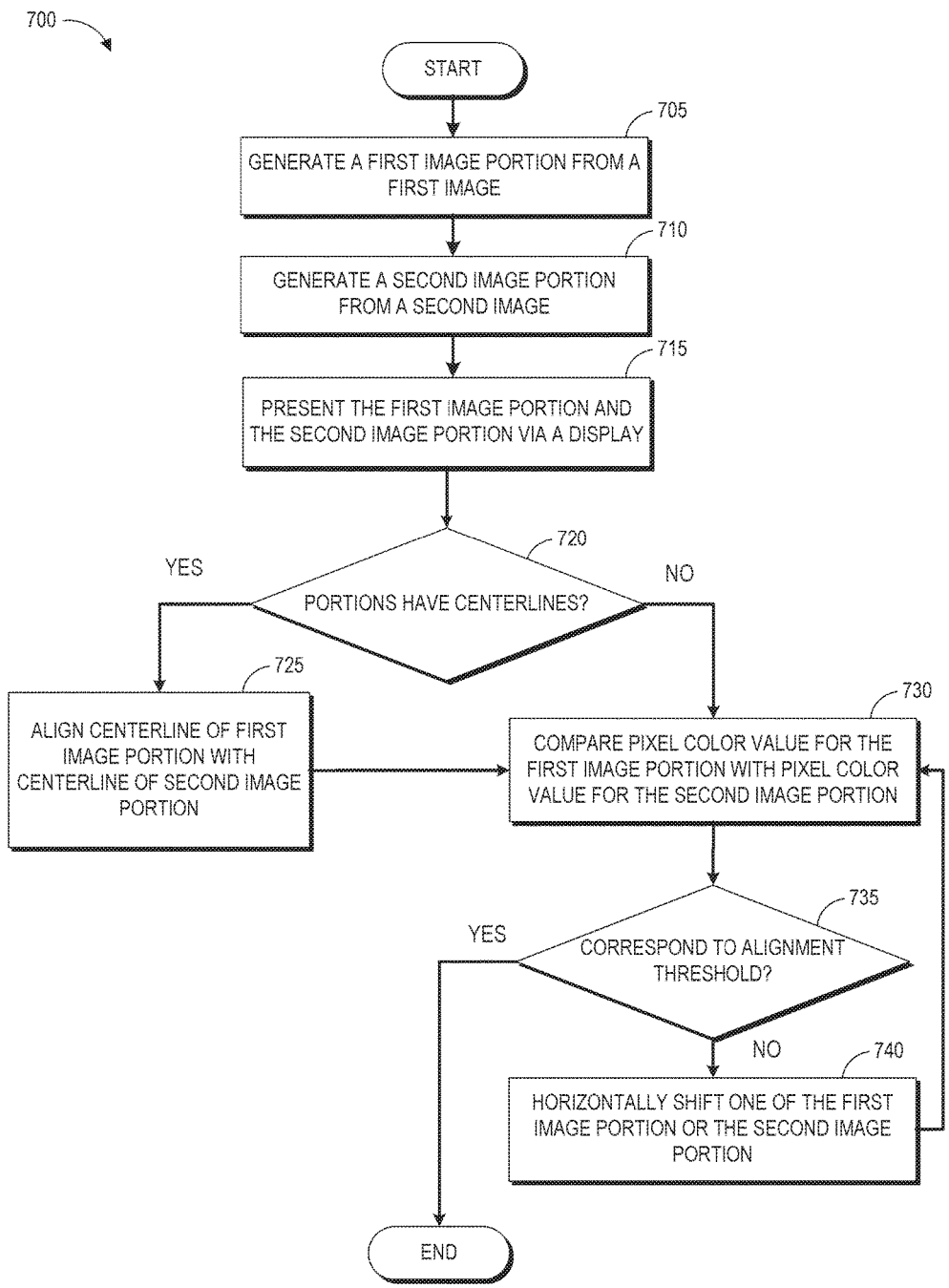
FIG. 7 is a flow diagram depicting an example method implemented in the browsing service.

FIG. 7 is a flow diagram depicting an example method implemented in the browsing service. The method 700 shown in FIG. 7 may be implemented in whole or in part by the devices described herein such as the image alignment module 384 and/or image segmentation module 386 of the access device 300 shown in FIGS. 2 and 3. Once segments are identified for presentation, the individual segments may not align to provide a full view of the subject. For example, if the subject is shown off center in a first portion, the view of the subject presented when the first and segments are combined may provide a discontinuous view which does not provide a realistic representation of the subject. Accordingly, the segments may be further processed to align the identified segments.

At block 705, a first image portion is generated from a first image. The first image portion may be generated by segmenting an image selected from a data store of images as discussed herein. At block 710, a second image portion is generated from a second image. As with the first image portion, the second image portion may be generated by segmenting a second image selected from a data store of images as discussed herein.

At block 715, the first image portion and the second image portion are presented via a display. The presentation may include displaying the portions in an interactive image viewer such as the interactive image viewer 102 shown in FIG. 1A. At block 720, a determination is made as to whether the first and second image portions include centerlines. A centerline is a logical line indicating the center of the subject shown in the image from the horizontal top of the image portion to the horizontal bottom of the image portion. Some segmentation techniques, such as those including skeletal modeling, may provide centerline information. If the portions include centerlines, at block 725, the centerline of the first image portion and the centerline of the second image portion are aligned to form a continuous straight line.

After aligning the centerlines, if available, or if centerlines are not available, the method 700, at block 730 may include performing additional alignment of the image portions based on color. At block 730, a pixel color value for a pixel from the first image portion may be compared to a pixel color value for another pixel from the second image portion. In some implementations, the pixel from the first image portion may be adjacent to the pixel from the second image portion. In some implementations, the pixel from the first image portion may be within a threshold distance from the pixel from the second image portion. If the comparison of the color values indicate that the pixels are similar, the images may be deemed aligned. For example, skin tone color values may be used to identify skin portions of a human subject shown in an image. Typically, color values for representing a person's skin tone is relatively consistent across images. The consistency may be enhanced by normalizing the color values for pixels included in the images and/or image portions. One example of such normalization is adjusting the brightness of the pixels. The comparison may include comparing the actual color values of the pixels to a threshold and/or the difference between the color values to a threshold.

At block 735, a determination is made as to whether the pixel color values correspond to an alignment threshold. For example, if the color value from the first image portion is within the range of skin tone and the color value from the second image portion exceeds the skin tone range, the determination may be negative. In such cases, the method 700 may continue to block 740 where at least one of the first image portion or the second image portion is adjusted. The adjustment may include horizontally or vertically changing the location of an image portion. By moving the image portion, the image portions may be aligned such that skin tone areas are substantially aligned to provide a realistic view of the subject. The adjustment may be according to a predetermined adjustment factor. In some implementations, the amount of adjustment to the image portions may be dynamically determined based on the discrepancy between the pixel color values from the image portions and/or the difference between the adjustment threshold and one or more of the pixel color values.

Figure 8D:
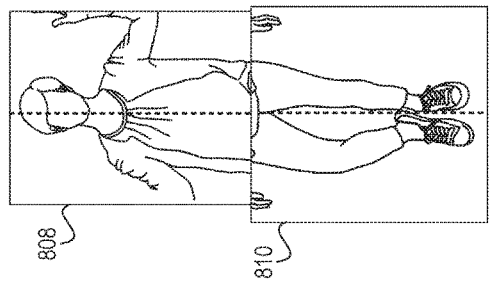
FIGS. 8A through 8D depict the segmentation of two images and alignment of segmented portions from the two images according to the method shown in FIG. 7.
Figure 8C:
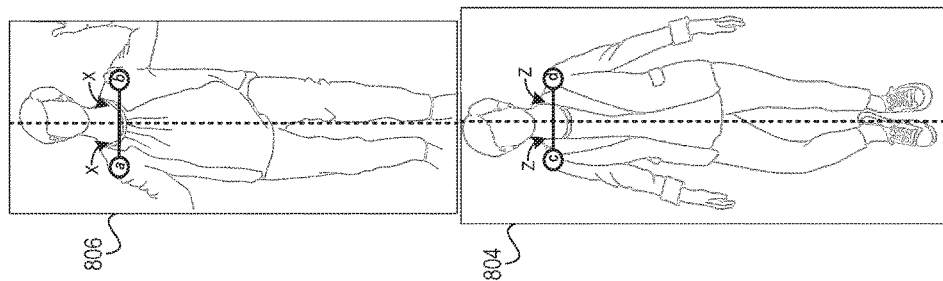
Figure 8B:
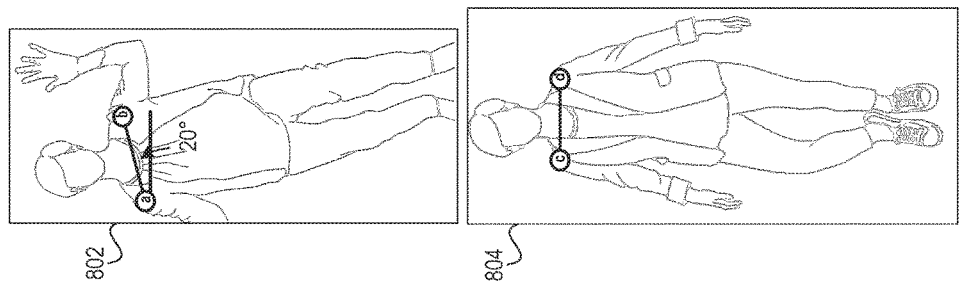
Figure 8A:
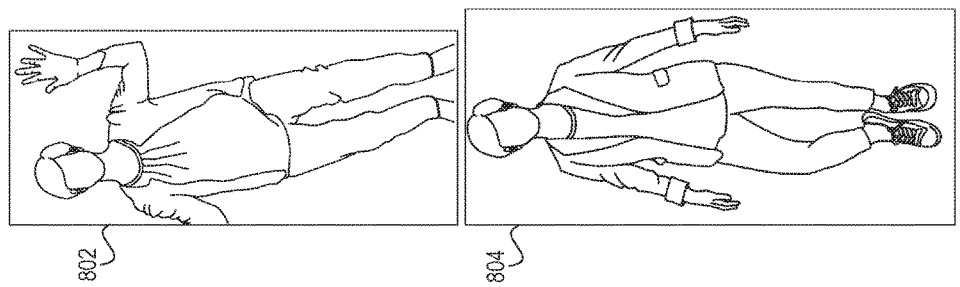

FIGS. 8A through 8D depict the segmentation of two images and alignment of segments from the two images according to the method shown in FIG. 7. FIG. 8A shows a first input image 802 and a second input image 804. The first input image 802 and the second input image 804 may have been identified for display via the user interface 100 of FIG. 1A. In FIG. 8B, poses of the subject in each input image are identified. The poses may be identified using image analysis of the images. The image analysis may include determining the pose based on depth and/or color information included in the input image. In some implementations, the pose may be identified using a structural model such as that shown in FIG. 5A.

As shown in FIG. 8B, the first input image 802, the shoulders of the subject are identified as points A and B. The shoulders within the second input image 804 are identified as points C and D. Points A and B in the first input image 802 are offset by 20 degrees. This indicates that the subject is shown in an asymmetric pose. Accordingly, the first input image 802 may be adjusted by 20 degrees to provide a symmetric view of the subject. In contrast, the shoulders of the subject as shown in the second input image 804 are parallel to the ground and thus indicate a symmetric pose.

In FIG. 8C, a rotated first image 806 is shown with a centerline. The centerline for the rotated first image 806 may be identified in relation to the previously identified structural reference. In the example shown in FIG. 8C, this includes identifying the centerline in reference to the shoulder points A and B. The centerline bisects the space between points A and B such that an equal distance (x) between the centerline and point A exists as between the centerline and point B. A similar centerline is identified for the second input image 804 and shown in FIG. 8C. In FIG. 8C, a second equal distance (z) between the centerline of the second input image 804 and point D exists as between the centerline and point D. In some implementations, the distance (z) may equal the distance (x). In other implementations, the distance (z) and distance (x) may be different. In such instances, it may be desirable to adjust one or both of the rotated first image 806 and the second input image 804 so that when the images are displayed, the subject is shown at visually consistent proportions. The adjustment may include zooming, scaling, and/or translating image data (e.g., pixel information). The adjustment may include consideration of depth information associated with the image data. In some implementations, the adjustment may be dynamically limited. For example, the known structure points (e.g., point A, B, C, or D) may be used to generate scaling boundaries indicating the maximum and minimum amount of scaling that may be applied to an image having the structure points. For instance, using the second input image 804 of FIG. 8C, the distance between the shoulder points C and D can be expressed as (2*z). It may be desirable to avoid scaling the image such that the scaled image shows these points at no less than a minimal distance and no more than a maximum distance. One way to express the scaling bounds is shown in Equation 1 below.

$$(scale_{min}, scale_{max}) = \left(\frac{d_{min}}{2z}, \frac{d_{max}}{2z}\right) \quad \text{Equation (1)}$$

where $d_{min}$ is a minimum distance between reference points; and $d_{max}$ is a maximum distance between reference points.

In some implementations, the adjustment factor may be further determined using information about the subject shown in the image. For example, it may be desirable to determine the gender of the subject. Based on the gender, specific adjustments may be performed more aggressively than others. For example, to avoid zooming an image to create a visual impression of having a large waistline for men, the adjustment factor may be weighted to allow more aggressive vertical scaling than horizontal scaling. Equation 2 below is one expression of a dynamic adjustment factor determination to identify a minimum horizontal zoom factor based on information about a subject shown in the image. Specifically, Equation 2 provides an example expression for determining a minimum horizontal zoom factor for a subject having an identified gender ($zoom_{x_{min}}(g)$).

$$zoom_{x_{min}}(g) = \alpha(g) zoom_{x_{min}} \quad \text{Equation (2)}$$

where g is a value indicating the gender of a subject shown in the image to be zoomed;

$\alpha$ is a gender weighting factor for horizontal (x) zoom; and $zoom_{x_{min}}$ is a value indicating the minimum horizontal (x) zoom factor.

FIG. 8D shows the segmented image portions 808 and 810 aligned using the centerlines from the respective images. The segmentation may be according to the segmentation methods described above such as with reference to FIG. 5A, 5B, 5C, 6A, 6B, 6C, or 6D. In some implementations, the segmented images may be further processed to enhance the final composed view. For example, parts of the subject's fingers are still visible on the left and right sides of the portion 810. These "floating" elements may be blurred or removed from the segment to improve the visual quality of the final presentation. The floating elements may be identified using color evaluation, edge detection, or other image processing techniques. In some implementations, pixels along adjacent edges of the portions 808 and 810 may be adjusted to smooth the transition from one portion to the other. Smoothing may include blurring pixels, adjusting transparency of the pixels, blending pixel values, performing a repair, dodge-and-burn, or other function on the pixels, or other image/pixel manipulations.

In some implementations, the partition information may be used to identify a location where the smoothing is to be performed. The smoothing may consider pixels along adjacent edges or within a tolerance of the edge (e.g., a neighborhood of 3, 7, 10, or more pixels). The tolerance may be predetermined and stored as a configuration value. In some implementations, the tolerance may be dynamically generated based on factors such as the partition information, image data, image source, information about items or subjects shown in a portion, and the like. Depth information may be used to mask areas for smoothing. For example, a first smoothing process may be performed using a background of a first portion and a background of a second portion. A second smoothing process may then be applied to the foreground of the first portion and the foreground of the second portion. In some implementations a third smoothing process may be included for processing areas where foreground of the first portion meets background of the second portion. Similarly, a further smoothing process may be included areas where the background of the first portion meets the foreground of the second portion.

The system may store a pose definition to identify a pose. The pose definition may include information identifying, for a subject positioned in the pose, a centerline for the pose and a position of two or more points, relative to each other, on the subject. For example, the two points may be a first shoulder and a second shoulder of the subject. For a given image, the points may be identified using data included in the image or related to the image such as depth information. By correlating the location of the points as shown in the image to the points identified in the pose definition, the pose associated with the pose definition may be detected. The system may provide the centerline from the pose definition as the centerline for the image.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as an image browsing device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image browsing device can be or include a microprocessor, but in the alternative, the image browsing device can be or include a controller, microcontroller, or state machine, combinations of the same, or the like configured to receive, process, and display image data. An image browsing device can include electrical circuitry configured to process computer-executable instructions. Although described herein primarily with respect to digital technology, an image browsing device may also include primarily analog components. For example, some or all of the browsing service algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a composite image processing device, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or any other form of a non-transitory computer-readable storage medium. An exemplary storage medium can be coupled to the image browsing device such that the image browsing device can read information from, and write information to, the storage medium. In the alternative, the storage medium can be integral to the image browsing device. The image browsing device and the storage medium can reside in an application specific integrated circuit (ASIC). The ASIC can reside in an access device or other image processing device. In the alternative, the image browsing device vice and the storage medium can reside as discrete components in an access device or other image processing device. In some implementations, the method may be a computer-implemented method performed under the control of a computing device, such as an access device or other image processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A computer-implemented method comprising:
  under control of a computing device executing specific computer-executable instructions,
   receiving, from a first device, horizontal partition information for an interactive display area, wherein the horizontal partition information identifies a first display zone located above a horizontal partition and a second display zone located below the horizontal partition;
   identifying a portion of a first image of a subject to present in the first display zone, the portion of the first image identified using a size of the interactive display area and the horizontal partition information, wherein the portion of the first image correlates to a first amount of the interactive display area covered by the first display zone;
   identifying a portion of a second image of the subject to present in the second display zone, the portion of the second image identified using the size of the interactive display area and the horizontal partition information, wherein the portion of the second image correlates to a second amount of the interactive display area covered by the second display zone;
   causing the portion of the first image to be presented in the first display zone via the first device and the portion of the second image to be presented in the second display zone via the first device;
   detecting a first interaction with the first display zone in the first direction relative to the horizontal partition via the first device;
   determining that a first magnitude of the first interaction does not satisfy a threshold;
   adjusting a location of the portion of the first image of the subject presented in the first display zone based at least in part on the first magnitude of the first interaction and the first direction, wherein a quantity of adjustment to the location corresponds to the first magnitude, and wherein a direction of the adjustment to the location corresponds to the first direction;

detecting a second interaction with the first display zone in a second direction relative to the horizontal partition via the first device;

determining that a second magnitude of the second interaction satisfies the threshold;

selecting a third image from an image data source to present in the first display zone;

identifying a portion of the third image to present in the first display zone, the portion of the third image identified using the size of the interactive display area and the horizontal partition information, wherein the portion of the third image correlates to the first amount of the interactive display area covered by the first display zone;

causing the portion of the first image from the first display zone to move out of the interactive display area along the first direction; and causing the portion of the third image in the first display zone to move into the interactive display area along the first direction to replace the portion of the first image.

2. The computer-implemented method of claim 1, wherein selecting the third image comprises:
identifying a category for an item shown in the portion of the first image;
searching an image data store using the category; and
receiving the third image in response to said searching, wherein the third image shows another item from the category.

3. The computer-implemented method of claim 1, further comprising:
identifying a first centerline for the first image;
identifying a second centerline for the second image; and
aligning the portion of the first image with the portion of the second image based at least in part on the first centerline and the second centerline.

4. The computer-implemented method of claim 1, further comprising:
storing the horizontal partition information, information identifying the portion of the second image presented in the second display zone, and information identifying the portion of the first image presented in the first display zone in a session record;
generating a record identifier for the session record;
receiving the record identifier;
retrieving the session record using the record identifier; and
causing an adjustment to at least one of the horizontal partition, the first display zone, and the second display zone of the interactive display area to show, via the interactive display area, the portion of the first image within the first display zone and the portion of the second image within second display zone.

5. A computer-implemented method comprising:
under control of a computing device executing specific computer-executable instructions,
identifying a portion of a first image of a first item to present in a first display zone of a graphical interface, wherein the portion of the first image correlates to a first amount of the graphical interface covered by the first display zone;

identifying a portion of a second image of a second item to present in a second display zone of the graphical interface, wherein the portion of the second image correlates to a second amount of the graphical interface covered by the second display zone;

causing presentation of the portion of the first image in the first display zone via a first device and presentation of the portion of the second image in the second display zone via the first device;

detecting an interaction with the first display zone via the first device, wherein the interaction includes an interaction magnitude;

determining that the interaction magnitude does not satisfy an interaction threshold; and adjusting a location of image data presented via the first display zone based at least in part on the interaction magnitude, wherein a quantity of adjustment to the location corresponds to the interaction magnitude.

6. The computer-implemented method of claim 5,
wherein the interaction includes an interaction direction, and
wherein adjusting the image data presented via the first display zone comprises adjusting the portion of the first image presented in the first display zone based at least in part on the interaction magnitude and the interaction direction.

7. The computer-implemented method of claim 5, wherein the interaction includes an interaction direction, and wherein adjusting the image data presented via the first display zone comprises:
determining that the interaction magnitude exceeds the interaction threshold;
selecting a third image;
identifying a portion of the third image to present in the first display zone, wherein the portion of the third image correlates to the first amount of the graphical interface covered by the first display zone; and
causing presentation of the portion of the first image in the first display zone to be replaced with presentation of the portion of the third image.

8. The computer-implemented method of claim 7, wherein causing presentation of the portion of the first image from the first display zone to be replaced comprises causing presentation of the portion of the first image from the first display zone as moving out of the graphical interface along the interaction direction, and causing presentation of the portion of the third image as moving into the graphical interface along the interaction direction.

9. The computer-implemented method of claim 7, wherein selecting the third image comprises:
identifying a category for the first item shown in the portion of the first image;
searching an image data store using the category; and
receiving the third image in response to the searching of the image data store, wherein the third image shows another item within the category.

10. The computer-implemented method of claim 9, further comprising:
generating a pseudo-random value; and
selecting the third image from a set of images received in response to the searching of the image data store using the pseudo-random value.

11. The computer-implemented method of claim 9,
wherein searching the image data store comprises transmitting a search request via a network to the image data store, and wherein causing presentation of the third image comprises causing presentation of a visible artifact for a portion of the item as shown in the portion of the third image, the visible artifact indicating that the third image was received from the image data store.

12. The computer-implemented method of claim 5, further comprising:
storing information identifying the portion of the second image presented in the second display zone and information identifying the portion of the first image presented in the first display zone in a session record;
generating a record identifier for the session record;
receiving the record identifier;
retrieving the session record using the record identifier; and
causing an adjustment to at least one of the first display zone and the second display zone to show, via the graphical interface, the portion of the first image within the first display zone and the portion of the second image within second display zone.

13. The computer-implemented method of claim 5, further comprising:
receiving, via the first device, horizontal partition information, wherein the horizontal partition information identifies the first display zone located above a horizontal partition and the second display zone located below the horizontal partition,
wherein the portion of the first image and the portion of the second image are identified using a size of the graphical interface and the horizontal partition information.

14. A system comprising:
a data store storing specific computer-executable instructions; and
a computing device in communication with the data store, the computing device including a processor that executes the specific computer-executable instructions to cause the system to at least:
identify a portion of a first image of a first item to present in a first zone of a graphical interface, wherein the portion of the first image correlates to a first amount of the graphical interface covered by the first zone;
identify a portion of a second image of a second item to present in a second zone of the graphical interface, wherein the portion of the second image correlates to a second amount of the graphical interface covered by the second zone;
cause presentation of the portion of the first image in the first zone via a first device and presentation of the portion of the second image in the second zone via the first device;
detect an interaction with the first zone via the first device, wherein the interaction includes an interaction magnitude;
determine that the interaction magnitude does not satisfy an interaction threshold; and
adjust a location of image data presented via the first zone based at least in part on the interaction magnitude, wherein a quantity of adjustment to the location corresponds to the interaction magnitude.

15. The system of claim 14,
wherein the interaction includes an interaction direction, and
wherein the processor executes the specific computer-executable instructions to adjust the image data presented via the first zone by causing the system to at least adjust the portion of the first image presented in the first zone based at least in part on the interaction magnitude and the interaction direction.

16. The system of claim 14, wherein the interaction an interaction direction, and wherein the processor executes the specific computer-executable instructions to adjust the image data presented via the first zone by causing the system to at least:
determine that the interaction magnitude exceeds the interaction threshold;
select a third image;
identify a portion of the third image to present in the first zone, wherein the portion of the third image correlates to the first amount of the graphical interface covered by the first zone; and
cause presentation of the portion of the first image in the first zone to be replaced with presentation of the portion of the third image.

17. The system of claim 16, wherein the processor executes the specific computer-executable instructions to cause presentation the portion of the first image in the first zone to be replaced by causing the system to at least cause presentation of the portion of the first image from the first zone as moving out of the graphical interface along the interaction direction, and cause presentation of the portion of the third image in the first zone as moving into the graphical interface along the interaction direction.

18. The system of claim 16, wherein the processor executes the specific computer-executable instructions to select the third image by causing the system to at least:
identify a category for the first item shown in the portion of the first image;
search an image data store using the category; and
receive the third image in response to the searching of the image data store, wherein the third image shows another item within the category.

19. The system of claim 18, wherein the processor executes the specific computer-executable instructions to further cause the system to at least:
generate a pseudo-random value; and
select the third image from a set of images received in response to the searching of the image data store using the pseudo-random value.

20. The system of claim 18,
wherein the processor executes the specific computer-executable instructions to search the image data store by causing the system to at least transmit a search request via a network to the image data store, and
wherein the processor executes the specific computer-executable instructions to cause presentation of the third image by causing the system to at least cause presentation of a visible artifact for a portion of the item as shown in the portion of the third image, the visible artifact indicating that the third image was received from the image data store.

21. The system of claim 14, wherein the processor executes the specific computer-executable instructions to further cause the system to at least:
store information identifying the portion of the second image presented in the second zone and information identifying the portion of an image presented in the first zone in a session record;
generate a record identifier for the session record;
receive the record identifier;
retrieve the session record using the record identifier; and
cause an adjustment to at least one of the first zone and the second zone to show, via the graphical interface, the portion of the first image within the first display zone and the portion of the second image within the second zone.

22. The system of claim 14, wherein the processor executes the specific computer-executable instructions to further cause the system to at least:
receive, via the first device, horizontal partition information, wherein the horizontal partition information identifies the first zone located above a horizontal partition and the second zone located below the horizontal partition,
wherein the portion of the first image and the portion of the second image are identified using a size of the graphical interface and the horizontal partition information.

* * * * *